May 12. 1942.    R. E. CROSS    2,282,306
INSERTABLE BLADE CUTTER
Filed March 25, 1940

INVENTOR.
Ralph E. Cross
BY

Patented May 12, 1942

2,282,306

UNITED STATES PATENT OFFICE 2,282,306

INSERTABLE BLADE CUTTER

Ralph E. Cross, Detroit, Mich.

Application March 25, 1940, Serial No. 325,676

3 Claims. (Cl. 29—105)

This invention relates to rotatable cutters for chamfering gear teeth and the object of the invention is to provide a cutter body having insertable blades and provided with means for adjusting the blades longitudinally of the body to position the cutting ends in predetermined relation with a fixed point on the body and securing them in fixed position at any point of adjustment.

Another object of the invention is to provide an insertable blade cutter comprising a longitudinally slotted body provided with means for adjusting the blades longitudinally in the respective slots, said means being arranged to maintain the blades in their respective slots in the cutter body while being adjusted longitudinally thereof.

Gear tooth chamfering cutters as heretofore made are of what is known as the "hollow mill type" in which the cutters are formed in the end wall of a tubular member which oftentimes are broken and after repeated grindings in the sharpening of the cutters require replacement of the body including means thereon by which it is secured to the driving means. The object of this invention therefore is to provide a body having a solid end portion and having a slot or slots in its circumference extending longitudinally of the body in parallel relation with the axis of rotation and opening through said end portion of the body, and a blade or blades adjustable longitudinally in the respective slot or slots to position the cutting ends thereof in operative relation with the gear tooth with the end of the body spaced from the tooth.

The adjustment of the blades longitudinally enables the same to be reground and readjusted for further use and are therefore utilizable for a considerable period of service and when no longer useable are replaceable by similar blades. Thus, in my improved gear tooth chamfering cutter, the cost of replacement is reduced to a minimum as the body itself may be continued in use through some years of time.

These and other objects and the several novel features of the invention are hereinafter more fully described and claimed and the preferred form of construction of a gear tooth chamfering cutter embodying my invention and by which these objects are attained is shown in the accompanying drawing in which—

Figure 1:
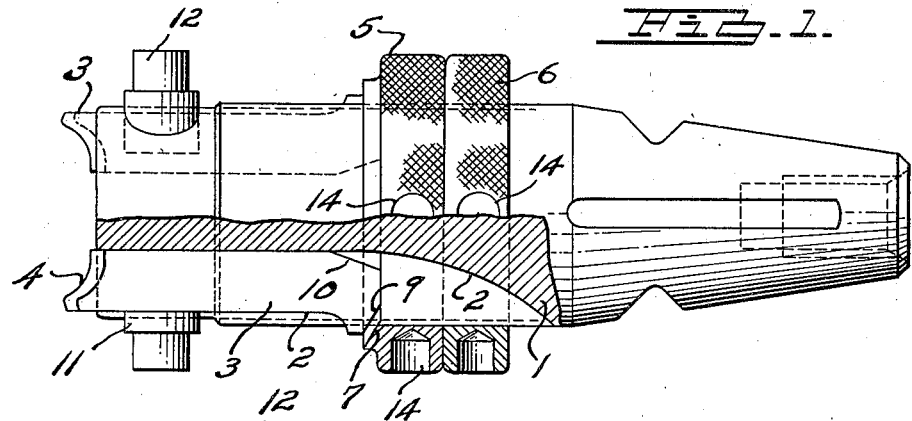
Fig. 1 is an elevation partly in section of a rotatable cutter for chamfering gear teeth embodying my invention.

The device comprises a cylindrical body 1 of solid form shown in Fig. 1 having a pair of slots 2 cut in opposite sides thereof to receive the cutter blades 3. Each cutter blade 3 is movable longitudinally of its slot 2 and is provided with a cutting edge 4 at the extending end. Threaded onto the cylindrical body 1 is a feed ring 5 and a lock ring 6 for locking the feed ring at any position of adjustment. The feed ring 5 is provided with a beveled edge 7 while the cutter blade is provided with an enlargement 8 having a conical chamfered end face 9 fitting against the beveled face 7 of the feed ring 5. On the opposite side from the boss 8 the cutter blade is provided with an angular clearance face 10.

By positioning both blades 3 in the slots 2 with the conical chamfered end faces 9 in engagement with the annular beveled face 7 of the feed ring 5 this ring may be turned on the threads to move the blades outwardly longitudinally of the body 1. By means of the beveled face 7 on the feed ring engaging the conical chamfered faces 9 of the cutter blades the cutter blades are also urged inwardly against the bottoms of their slots and are prevented from coming outwardly at the opposite end by the shoes 11 which engage thereover and are held in place by the locking screws 12. The shoes 11 are loosely mounted on the respective shanks of the screws and the body of the cutter provided with recesses to receive the shoes 11 permitting movement thereof inwardly of the respective recess thereby adapting the same for use with cutter bodies of greater or less width of face parallel with the longitudinal axis of the screw.

By means of the feed ring 5 both cutter blades may be advanced to the same extent and when properly adjusted the screws 12 may be turned up to bindingly engage the shoes 11 over the blades and lock them in their slots. At the same time, the lock ring 6 may be threaded up into engagement with the feed ring 5 by means of the spanner wrench holes 14 to lock the feed ring in place.

Figure 2:
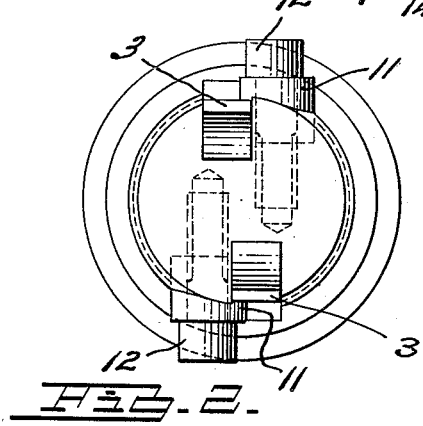
Fig. 2 is an end view of the cutter showing the blades in cutting position.
Figure 3:
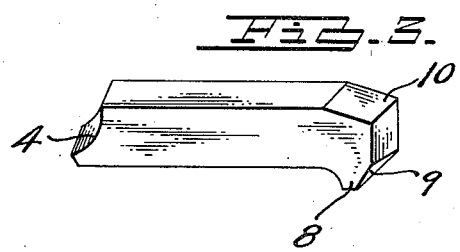
Fig. 3 is a side elevation of one of the insertable blades.

The rear end of the body 1 is shaped to fit in a standard chuck. The particular form of cutter blade shown is utilized for chamfering the ends of gear teeth but these blade ends may be of any desired shape for any particular operation. It is to be particularly noted that only the cutting ends of the blades project beyond the forward end of the body 1 and thus these blades are backed up and breakage reduced to a minimum as will be understood from Fig. 2, by the solid body 1.

Figure 4:
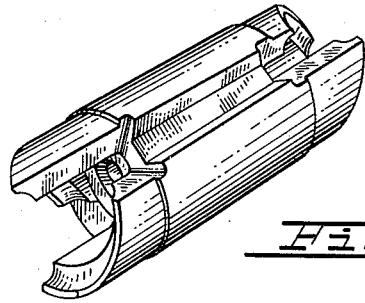
Fig. 4 is a view of the old non-insertable blade cutter of this type.

This is in direct contrast to the ordinary form of cutter for this purpose shown in Fig. 4 in which the cutting edges of the blades extending to a considerable distance beyond the end of the body so that this end is very apt to chatter and produce poor work and are more readily breakable. Also, in the former type of cutter shown in Fig. 4, after the cutting edges have been re-sharpened a few times it is necessary to discard the entire cutter which involves considerably more expense than is the case with my improved cutter shown in Figs. 1 and 2 which requires only insertion of new blades to provide a practically new cutting tool.

Also my improved device will allow ready removal of the cutter blades by loosening the screws 12 and shoes 11. The blades may then be reground to provide new cutting edges and re-inserted without difficulty in the tool.

As the cutting blades are duplicates, a large number of the blades may be ground at the same time in a single jig due to the fact that the blades may be all held at the same angle while a grinder is moved over the cutting ends of the blades to produce new cutting edges. Another feature of my improved gear tooth chamfering cutter is that the blades may be made from high speed tool steel while the body and other parts may be made of such less expensive material, the character of blades resulting in a uniform quality of cutting action which is impossible with the form of cutter shown in Fig. 4 due to the fact that it would be too expensive to make the entire cutter of high speed tool steel and consequently requires that only the cutting edges be hardened and after these have been ground a few times the hardened surfaces are ground away and the tool is unfit for further use.

The body 1 may have a single slot or a plurality of slots in the outer surface thereof extending longitudinally of the body in parallel relation with the axis of rotation for use with one or more blades as may be desired and, while not here shown, the bottom of the slot or slots may be parallel with or at an angle to the axis of rotation, the latter form being required when it is desired to tip the cutting ends of the blades at an angle to the axis of rotation.

By the described arrangement of parts it is only the blades that are worn and require replacement as the body is useable for a long period of time thereby resulting in a very considerable saving in comparison to the present "hollow mill" type of tool shown in Fig. 4 wherein the entire body requires to be replaced when the cutters have been ground to the limit. It is also pointed out that the cutters project from the end of the body only to such extent as to prevent contact of the body end with the gear tool when the cutter or cutters are in chamfering relation therewith.

From the foregoing description it becomes evident that the device is very simple and efficient in operation, will maintain the cutter blades in the bottom of their slots in the body, will adjust one, two or more blades to cutting position and provides a device which accomplishes the objects described.

Having thus fully described my invention, its utility and mode of operation, what I claim and desire to secure by Letters Patent of the United States is:

1. A rotatable cutter for chamfering the ends of gear teeth comprising a cylindrical body portion provided with longitudinal slots in the outer surface on opposite sides thereon in equi-spaced relation and parallel with and equally distant from the axis of rotation, a blade mounted in each slot and movable longitudinally therein, each blade having a cutting end projecting forwardly of the end of the body, a feed ring threaded on the body and engaging the opposite ends of the blades, said opposite ends of the blades being beveled and the feed ring being provided with an annular beveled surface for contacting the beveled ends of the blades to prevent outward displacement thereof, a lock ring in threaded relation with the body and turnable to position to lock the feed ring at any point of adjustment, and a releasable lock shoe for each blade adjacent the end thereof projecting from the end of the cutter body for fixedly securing the blades in adjusted position in the respective slots, said body having recesses into which the respective shoes may be moved by the respective screw thereby adapting the same for use with blades of greater or less width substantially as described.

2. A rotatable cutter for chamfering the ends of gear teeth comprising a body portion provided with longitudinal slots in parallel relation on opposite sides of the body portion and in equi-spaced relation with the axis of rotation of the body portion, a blade mounted in each slot and movable longitudinally thereof, each blade being provided with a cutter end and a conical chamfered opposite end, a feed ring threaded onto the body portion and provided with an annular beveled face movable into engagement with the conical chamfered ends of the cutter blades, the feed ring being turnable on the body portion to adjust the cutter blades longitudinally of the body portion, means for locking the feed ring at any adjustment, and means for locking the cutter blades at any adjustment, said means comprising a headed screw for each of the blades in threaded relation in a threaded aperture respectively provided therefor in the body, the longitudinal axis of which is parallel with the side wall of the respective slot, and a shoe on each of said screws, the body having a recess for each screw opening through the respective slot permitting the shoes to be moved inwardly of its recess to adapt the device for shoes of different widths transversely of the body.

3. A rotatable cutter for chamfering the ends of gear teeth comprising a cutter body having a forward end portion at substantially a right angle to the axis of rotation, said body having a series of oppositely disposed slots in its outer surface each in a plane cutting the axis of rotation, a cutter blade positioned in each of said slots with the cutting end thereof projecting forwardly of said forward end portion of the body, said means comprising oppositely disposed screws and threaded apertures provided therefor transversely of the body, a shoe non-rotatably mounted on the screw and engageable by the head thereof to maintain the same in contact with the respective cutter blade, said body having a recess opening through the surface of the body for each of said shoes of a depth greater than the width of the shoe and at the rear end comprising a feed ring having a beveled edge for engaging a beveled edge provided at the rear end of each of the cutters to position to effect the chamfering of a gear tooth without contact of the tooth with the said end portion of the body, means for securing each of the cutters to the body, and means for simultaneously adjusting the cutters in the respective slots to compensate for shortening in length of the cutter blade due to wear and re-grinding.

RALPH E. CROSS.